(12) United States Patent
Ringland et al.

(10) Patent No.: US 11,336,623 B2
(45) Date of Patent: May 17, 2022

(54) DATA PROCESSING METHOD

(71) Applicant: British Telecommunications Public Limited Company, London (GB)

(72) Inventors: Simon Ringland, London (GB); Francis Scahill, London (GB); Timothy Twell, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 15/733,355

(22) PCT Filed: Dec. 21, 2018

(86) PCT No.: PCT/EP2018/086578
§ 371 (c)(1),
(2) Date: Jul. 8, 2020

(87) PCT Pub. No.: WO2019/134858
PCT Pub. Date: Jul. 11, 2019

(65) Prior Publication Data
US 2020/0336469 A1    Oct. 22, 2020

(30) Foreign Application Priority Data

Jan. 8, 2018  (EP) .................................... 18150645

(51) Int. Cl.
| | | |
|---|---|---|
| *G06F 7/04* | (2006.01) | |
| *G06F 17/30* | (2006.01) | |
| *H04N 7/16* | (2011.01) | |
| *H04L 29/06* | (2006.01) | |

(52) U.S. Cl.
CPC ...... *H04L 63/0414* (2013.01); *H04L 63/0236* (2013.01); *H04L 63/0421* (2013.01); *H04L 63/102* (2013.01); *H04L 2209/42* (2013.01)

(58) Field of Classification Search
CPC ............. H04L 63/0414; H04L 63/0236; H04L 63/0421; H04L 63/102; H04L 2209/42;
(Continued)

(56) References Cited

U.S. PATENT DOCUMENTS

| | | | | |
|---|---|---|---|---|
| 8,862,537 B1* | 10/2014 | Kurtic | ................... | G06F 21/602 |
| | | | | 707/602 |
| 2004/0006642 A1* | 1/2004 | Jang | ...................... | H04W 12/02 |
| | | | | 709/245 |

(Continued)

FOREIGN PATENT DOCUMENTS

| | | |
|---|---|---|
| CN | 1714542 A | 12/2005 |
| CN | 1917462 A | 2/2007 |

(Continued)

OTHER PUBLICATIONS

Examination Report under section 18(3) for GB Application No. 1800263.4, dated May 5, 2020, 3 pages.

(Continued)

*Primary Examiner* — Amie C. Lin
(74) *Attorney, Agent, or Firm* — Patterson Thuente IP

(57) ABSTRACT

There is disclosed a method of processing a data packet received by a packet sniffer, the packet containing an associated identifier, the method including transmitting the packet to a recipient, determining if the identifier corresponds to a particular network, wherein if the identifier is determined to correspond to the particular network, the identifier is provided to the recipient; and if the identifier is determined to not correspond to the particular network, the identifier is withheld from the recipient.

12 Claims, 5 Drawing Sheets

(58) Field of Classification Search
CPC ........... H04L 63/1425; H04L 63/0407; H04W 84/12; H04W 12/02; G06F 21/6254; G06F 21/6263
See application file for complete search history.

(56) References Cited

U.S. PATENT DOCUMENTS

| | | | |
|---|---|---|---|
| 2005/0249225 A1* | 11/2005 | Singhal | H04L 63/1466 370/401 |
| 2008/0005264 A1 | 1/2008 | Brunell et al. | |
| 2008/0181405 A1 | 7/2008 | Seppanen | |
| 2009/0235354 A1 | 9/2009 | Gray et al. | |
| 2015/0195710 A1* | 7/2015 | Bar-Niv | H04W 12/02 726/23 |
| 2017/0223003 A1* | 8/2017 | Miles | G06F 21/6254 |
| 2018/0124013 A1* | 5/2018 | Theogaraj | H04W 12/02 |

FOREIGN PATENT DOCUMENTS

| | | |
|---|---|---|
| CN | 104247369 A | 12/2014 |
| CN | 104255059 A | 12/2014 |
| WO | WO-0203219 A1 | 1/2002 |

OTHER PUBLICATIONS

Extended European Search Report for Application No. 18150645.2, dated Mar. 26, 2018, 9 pages.
Taghavi T., et al., "Antenna Design for Graph Inference: Striking a Balance between Quality and Quantity," 2014, 1 page.
Written Opinion of International Searching Authority for International Application No. PCT/EP2018/086578, dated Jul. 11, 2019, 6 pages.
Office Action and Search Report for Chinese Application No. 201880078469.3, dated Nov. 23, 2021, 20 pages.

* cited by examiner

DATA PROCESSING METHOD

PRIORITY CLAIM

The present application is a National Phase entry of PCT Application No. PCT/EP2018/086578, filed Dec. 21, 2018, which claims priority from EP Patent Application No. 18150645.2, filed Jan. 8, 2018, each of which is hereby fully incorporated herein by reference.

TECHNICAL FIELD

The disclosure relates to performing diagnostics on a wireless LAN.

BACKGROUND

A typical wireless LAN comprises several devices each of which communicate with the internet via an access point. In a domestic LAN, the access point and the devices are typically located in the home of a user. In order to perform diagnostics on the devices, a packet sniffer may be used which captures copies of data packets transmitted by neighboring devices and uploads them to a server for diagnostic processing. This diagnostic processing involves processing the packet data with a view to determining whether all of the devices are performing adequately.

In such arrangements the sniffer may capture data packets from devices that are owned by third parties (as opposed to being owned by the user). These third party packets affect the communications environment. For example, a third party may be downloading large amounts of data, thus reducing the bandwidth available for the user's devices. It is therefore desirable that third party packets be included in the diagnostic processing.

SUMMARY

According to a first aspect of the disclosure there is provided a method of processing a data packet received by a packet sniffer, the packet containing an associated identifier, the method comprising: transmitting the packet to a recipient, determining if the identifier corresponds to a particular network; wherein if the identifier is determined to correspond to the particular network, the identifier is provided to the recipient; and if the identifier is determined to not correspond to the particular network, the identifier is withheld from the recipient.

Uploading third party data to a server, where the data contains identity information relating to the third party, raises issues of privacy and is therefore undesirable. These privacy issues can be avoided by, for example, removing the identity information from the packets prior to uploading them to the server. However, this prevents the diagnostic processing from identifying client devices which are, say, not performing adequately. The present disclosure enables a method to be performed in which both client data and third party data is made available at a recipient server for diagnostic analysis without infringing the privacy of third parties. The privacy of third parties is not infringed because the identity information relating to third parties is not transmitted to the server.

Providing the identifier to the recipient may take place after the packet is received by the recipient. The packet may not contain the identifier at the time that the packet is transmitted to the recipient. Providing the identifier to the recipient may take place separately from the step of transmitting the packet to the recipient. Providing the identifier to the recipient may comprise transmitting a data file containing the identifier to the recipient, the data file being different to the data packet.

In some embodiments transmitting the packet to a recipient comprises providing the identifier to the recipient in coded form. This coded identifier may be transmitted to the recipient as part of the packet. The coded identifier may have the form of a reference code. Providing the identifier to the recipient in coded form may comprise overwriting the identifier using the coded identifier. Transmitting the packet to a recipient may occur by wired channels.

In some embodiments the packet contains a single identifier. The identifier may comprise a media access control (MAC) address. Alternatively, the identifier may comprise an SSID. In some embodiments the packet contains a plurality of identifiers. In embodiments in which the packet contains a plurality of identifiers the method may be performed in respect of each 10 identifier in the plurality of identifiers. The plurality of identifiers may include one or more MAC addresses and/or one or more service set identifier (SSIDs). The plurality of identifiers may comprise between three and six MAC addresses. Each MAC addresses may correspond to any of the following: the device from which the packet originated, the device from which packet was transmitted, the device which the packet was sent to or the device which is the ultimate 15 destination of the packet. The plurality of identifiers may comprise one or more SSIDs.

Providing the identifier to a recipient may comprise sending decoding information to the recipient to enable the coded identifier to be decoded. The decoding information may comprise the identifier and the reference code. The decoding information may be sent to the recipient separately from the packet. The decoding information may be recorded, such as in a table. The decoding information corresponding to a plurality of packets may be recorded in a single table. In some embodiments the decoding information relating to MAC addresses is recorded in a separate table from the recording information relating to SSIDs. Preferably the recipient is a server. In some embodiments the particular network is a local area network (LAN). The method may further comprise removing some or all of the packet's payload before transmitting the packet to the recipient.

Determining if the identifier corresponds to a particular network may comprise comparing the identifier to list of devices which have associated to the particular network. The list of devices may be provided by an access point of the network. If the identifier is determined not to correspond to the particular network, the identifier and decoding info associated with that identifier may be deleted from the record.

The sniffer may be adapted to capture copies of data packets transmitted wirelessly. The sniffer may be located in the vicinity of an access point of the network.

The recipient may receive the transmitted packet and may send the received packet to a further recipient for diagnostic processing.

The method may comprise preliminarily determining if the identifier corresponds to a particular network before transmitting the packet to the recipient. In some embodiments, if in this preliminary determining the identifier is determined to correspond to a particular network, the packet sent to the recipient contains the identifier in non-coded form. If in this preliminary determining the identifier is determined not to correspond to a particular network, the method proceeds in accordance with embodiments as discussed above. In alternative embodiments, if in this preliminary determining the identifier is determined to correspond to a particular network, the packet sent to the recipient contains the identifier in encoded form.

The method may be performed by a data processing device, which may be associated with a sniffer and may be adapted to perform the method on packets received by the associated sniffer. The data processing device may comprise a member device of the particular network and may comprise an access point to the particular network. The sniffer may be adapted to capture packets from the access point. In some embodiments the method is performed at more than one location. In these embodiments there may be a plurality of data processing devices, each of which may have an associated sniffer.

If packets received at more than one sniffer contain the same identifier, the identifiers may be sent to the recipient in the same encoded form. This makes the process of decoding the coded identifiers less problematic. An initial coded form may be assigned to an identifier. This initial coded form may be replaced by a master coded form.

According to a second aspect of the disclosure there is provided a network device adapted to process a data packet, the network device comprising a transmitter adapted to transmit the packet to a recipient; a determiner adapted to determine if the identifier corresponds to a particular network; wherein, if the determiner determines that the identifier corresponds to the particular network, the network device is adapted to provide the identifier to the recipient; and if the determiner determines that the identifier does not correspond to the particular network, the network device is adapted to withhold the identifier from the recipient.

The network device is further adapted to carry out the method according to the first aspect of the disclosure defined above.

BRIEF DESCRIPTION OF THE DRAWINGS

There now follows a detailed description of embodiments of the disclosure, for illustration purposes only, with reference to the appended drawings, in which.

DETAILED DESCRIPTION

Figure 1:
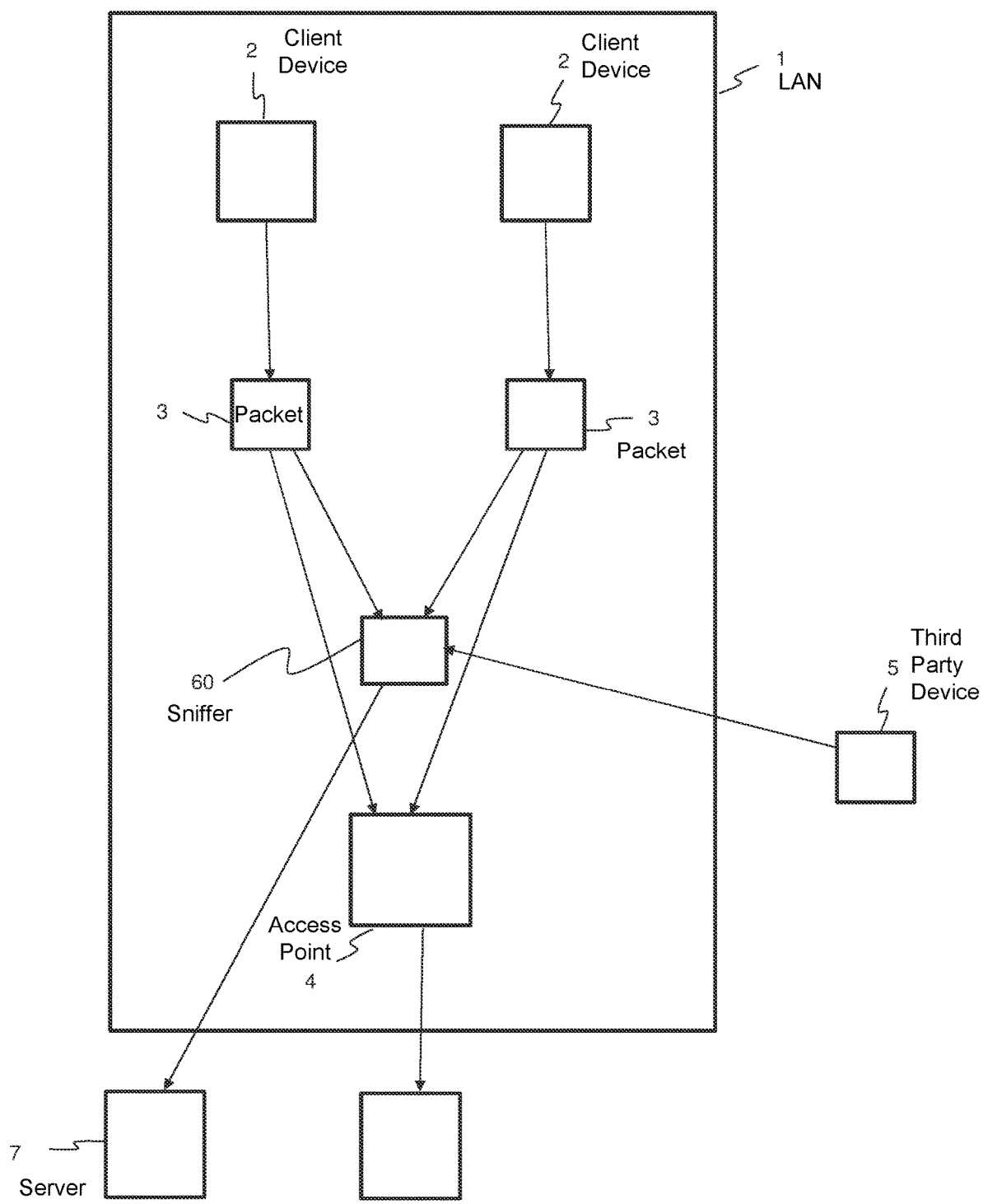
FIG. 1 is a schematic drawing of a LAN which is adapted to perform the method according to the disclosure, the LAN containing a single access point.

A schematic representation of a typical wireless LAN is shown at FIG. 1 and is indicated at 1. In particular, the LAN 1 includes a plurality of client devices 2. These will be referred to as LAN clients 2. These LAN clients 2 are part of the LAN 1 and are associated with an access point 4. In particular, the LAN clients 2 are able to transmit data packets 3 wirelessly to, and receive data packets 3 wirelessly from, the access point 4. Please note that, although the example LAN 1 shown in FIG. 1 contains only one access point 4, LAN 1 could contain more than one access point 4.

FIG. 1 also shows a third party device 5 located outside the LAN 1. This third party device 5 is not part of the LAN and so is not associated with the access point 4 (although it may be part of its own, third party LAN—not shown in the figures).

FIG. 1 also shows a sniffer 60. The sniffer 60 is located in the vicinity of the access point 4 and is able to receive data packets 3 wirelessly from both the LAN clients 2 and the third party device 5. The sniffer 60 can process the packets 3 it receives and can upload them to a server 7. As third party device 5 transmits packets 3 wirelessly such packets 3 may be received by the sniffer 60. The sniffer 60 uploads both client and third party packets 3 to the server 7.

Figure 2:
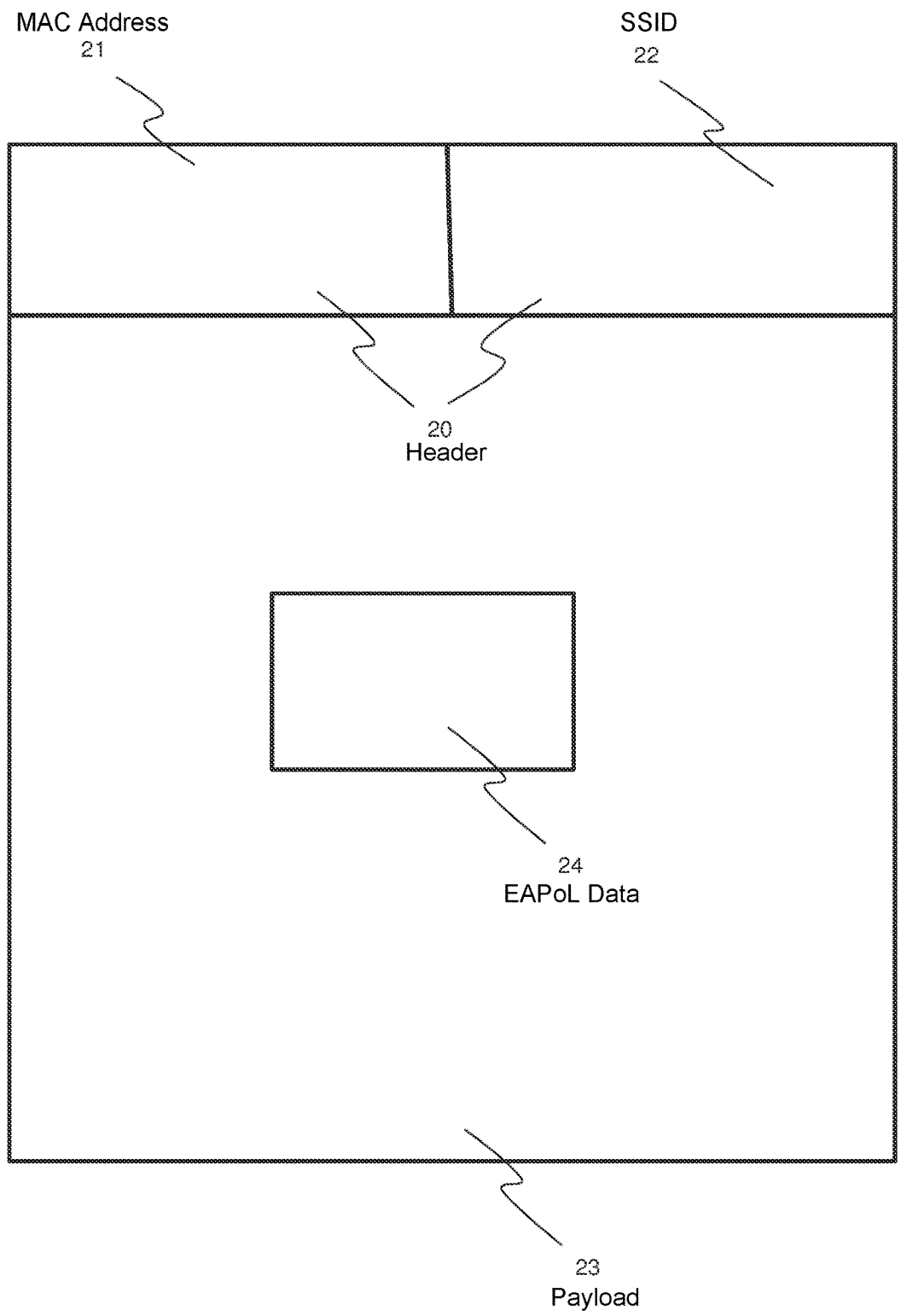
FIG. 2 is a schematic drawing of a data packet upon which the method according to the can be performed.

FIG. 2 is a schematic representation of a typical data packet 3 for use in accordance with the disclosure. In particular, there is a header 20 which contains, among other things, a MAC address 21 and an SSID 22. Although only one MAC address is shown, a typical data packet has between one and six MAC addresses. These MAC addresses include the MAC addresses of the device from which the packet 3 originated, the device which transmitted the packet, the device which will next receive the packet and the device which is the ultimate destination of the packet 3. Furthermore, although one SSID is shown if FIG. 2, packets 3 may have zero, one or more than one SSID. Furthermore, the MAC addresses and SSIDs may be located in the header or the body of the packet 3.

The payload 23 of the packet 3 is also shown in FIG. 2. The payload 23 may contain, among other things, EAPoL data 24. The EAPoL data 24 is used in the process of authenticating the sender of the packet 3.

In some known systems, diagnostic processing on the type of LAN shown in FIG. 1 comprises a sniffer sending all the packets of data (i.e., both client data packets and third party data packets) to the server 7. From there diagnostic processing is applied to the packets with the aim of determining whether the client devices are performing effectively.

The present disclosure anonymizes some or all of the MAC addresses and SSIDs in the data packets 3 before the data packets 3 are sent to the server 7 for diagnostic processing. A first embodiment of the disclosure will now be described.

In a first embodiment of the disclosure a packet 3 is received by the sniffer 60. The MAC addresses 21 and SSIDs 22 on the packet are read. The sniffer 60 receives information from the access point 4 in relation to which devices are the client devices 2 of the LAN 1. If the MAC addresses 21 and SSIDs 22 indicate that the packet 3 was sent by a client device 2 of the LAN 1, the MAC addresses 21 and SSIDs 22 are not anonymized (i.e., they are not overwritten by MAC code 10 and SSID code 11) before being sent to the server 7. Instead, the packet is sent to the server with the MAC addresses 21 and SSIDs 22 in non-anonymized form. These packets are stored at the sniffer 60 and then sent to the server 7 in batches. The MAC addresses and SSIDs 22 of the packets are entered in a look up table 14, 15 along with a flag indicating the device has associated to the LAN.

If the MAC addresses 21 and SSIDs 22 indicate that the packet 3 was sent by a device which is not a client device 2 of the LAN 1, the sending device must be either (i) a third party device; or (ii) a device which is part of the network, but at the time of sending, the device had not yet been observed by the sniffer 60 to have successfully associated to the LAN 1. The devices of (ii) are not third party devices and so there is no need for the MAC addresses and SSIDs to remain anonymized. The present embodiment enables these MAC addresses and SSIDs to be de-anonymized at the server, while preventing the third party MAC addresses and SSIDs to be de-anonymized at the server. This is achieved as follows.

Figure 3:
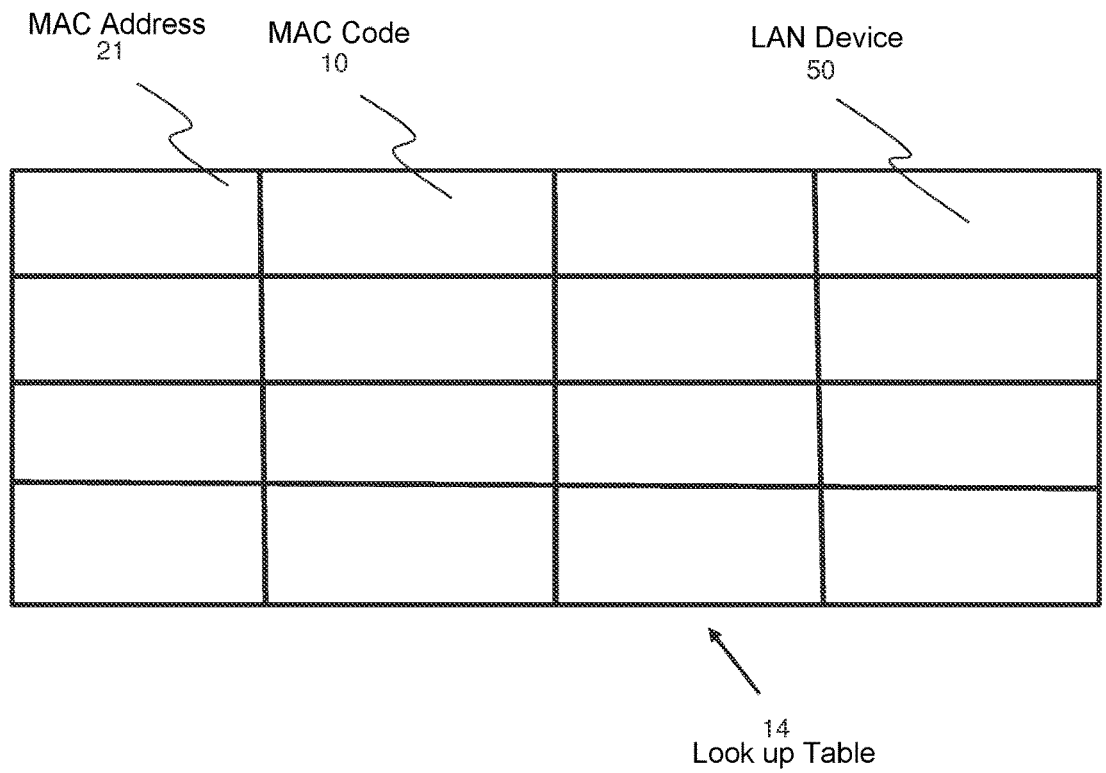
FIG. 3 is a schematic drawing of look up tables for use in the method according to the disclosure.
Figure 3:
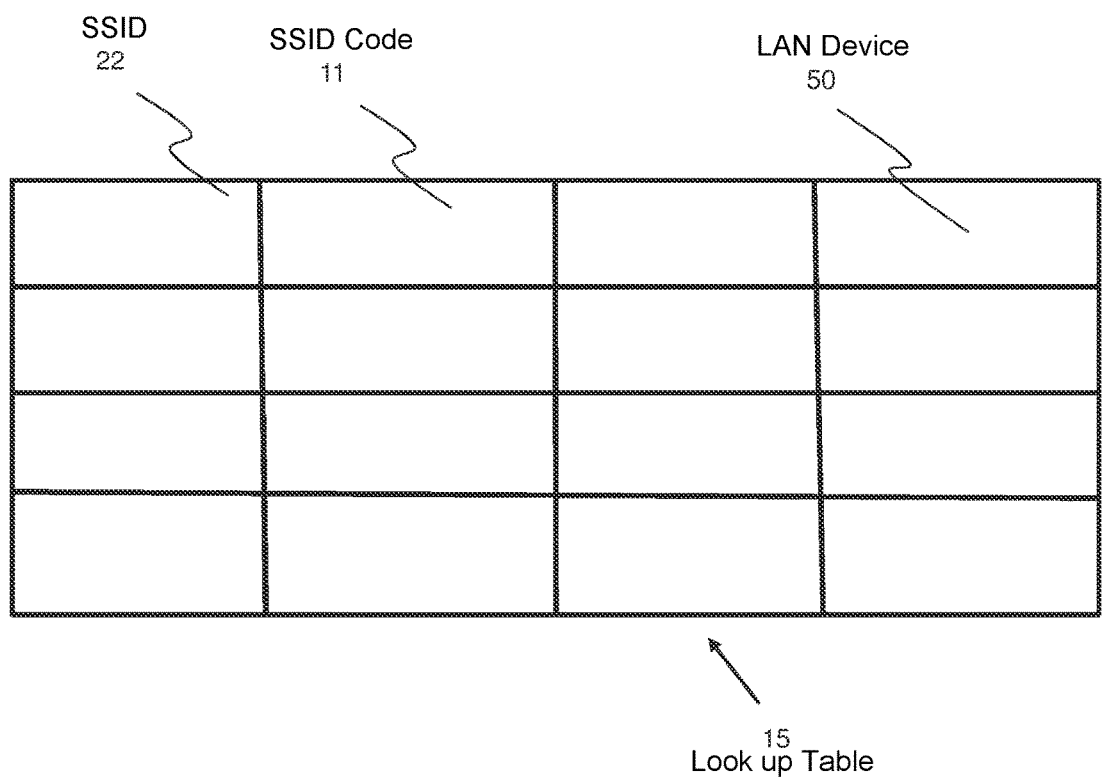

If the MAC addresses 21 and SSIDs 22 indicate that a packet 3 received at the sniffer 60 was sent by a device which is not a client device 2 of the LAN 1, the MAC addresses 21 are entered in a look up table 14 (see FIG. 3). A reference code, which I will refer to as MAC code 10, is then assigned to each MAC address. MAC code 10 may have a simple form (e.g., MAC-1). The MAC code 10 is entered in the same row of the look up table 14 as its respective MAC address 21, but in a second column. The MAC address 21 in the packet 3 is then overwritten with its assigned MAC code 10.

A similar method is then applied to the SSID 22 of the packet. In particular, one or more SSIDs 22 from of the packet 3 are entered in a second look up table 15. A reference code, which is referred to as the SSID code 11, is then assigned to each SSID 22. SSID code 11 is entered in the same row of the look up table 15 as SSID 22, but in a second column. Each SSID 22 in the packet 3 is then overwritten with its respective SSID code 11.

The packet is truncated to remove the payload 23. This is so the payload 23 is not uploaded to the server 7 (as uploading the payload of a third party data packet to the server would infringe the privacy of the third party).

If the access point 4 indicates to the sniffer 60 that successful authentication between the client device 2 and the LAN 1 has occurred, a mark is placed in the look up tables 14, 15 next to the MAC address/SSID corresponding to that device 2. The mark is placed in the "LAN Device" column 50 of the look up tables 14, 15 (see FIG. 3). Periodically, the sniffer 60 sends a batch of anonymized packets 3 to the server 7. When it is desired to send such a batch, a copy of each of the look up tables 14, 15 is made. All entries which do not have a mark in the LAN Device column are deleted (or "trimmed") from the copies of the look up tables 14, 15. These trimmed look up tables are sent to the server along with the batch of anonymized packets 3. The server uses the trimmed look up tables 14, 15 to de-anonymise the anonymized MAC addresses and SSIDs in the anonymized packets 3 it has received. As the trimmed look up tables 14, 15 contain MAC codes 10 and SSID codes 11 corresponding to client devices (that recently associated to the LAN 1). The trimmed look up tables do not contain MAC codes 10 or SSID codes corresponding to third party devices. Therefore it is not possible to de-anonymized the MAC addresses or SSIDs associated with third party devices. Thus embodiments of the disclosure prevent the privacy of the third party devices from being infringed, while making available the MAC addresses and SSIDs of all devices associated to the LAN 1.

In the second embodiment of the disclosure, the MAC addresses and SSIDs of all packets 3 received at the sniffer 60 are anonymized, not simply those MAC addresses and SSIDs corresponding to devices that have not associated to the LAN 1. The process of this anonymization is as described in relation to the first embodiment. In particular, when any packet is received at the sniffer 60, the MAC addresses 21 of the packet 3 are entered in a look up table 14 (see FIG. 3). A MAC code 10 is then assigned to each MAC address and is entered in the same row of the look up table 14 as its respective MAC address 21, but in a second column. The MAC address 21 in the packet 3 is then overwritten with its assigned MAC code 10. Zero or more SSIDs 22 from of the packet 3 are entered in a second look up table 15. An SSID code 11, is then assigned to each SSID 22. SSID code 11 is entered in the same row of the look up table 15 as SSID 22, but in a second column. Each SSID 22 in the packet 3 is then overwritten with its respective SSID code 11.

As in the first embodiment, the packet is truncated to remove the payload 23. This is so the payload 23 is not uploaded to the server 7 (as uploading the payload of a third party data packet to the server would infringe the privacy of the third party).

If a MAC/SSID of a packet 3 received by the sniffer 60 corresponds to a device which can be determined to be part of the LAN 1 a mark is placed in the look up tables 14, 15 next to the MAC address/SSID corresponding to that device 2. The mark is placed in the "LAN Device" column 50 of the look up tables 14, 15 (see FIG. 3). If a device 2 is not associated to the LAN 1 at the start of the session, MAC address/SSID entries will be made in the look up tables 14, 15, but no mark will be entered. If the device 2 associates to the LAN 1 during the session, then, when the sniffer 60 receives a packet containing MAC addresses/SSIDs corresponding to the device, the sniffer 60 will detect that the corresponding device 2 has now associated to the LAN 1 and so will enter a mark next to the MAC addresses/SSIDs corresponding to the device in the look up tables 14, 15. Therefore, in this second embodiment, a mark will be placed in respect of MAC addresses/SSIDs corresponding to a) devices that have been part of the LAN 1 since before the session began; and b) devices that have joined the LAN 1 since the session began. Periodically, the sniffer 60 sends a batch of anonymized packets 3 to the server 7 for processing. When it is desired to send such a batch, a copy of each of the look up tables 14, 15 is made. All entries which do not have a mark in the LAN Device column are deleted (or "trimmed") from the copies of the look up tables 14, 15. These trimmed look up tables are sent to the server along with the batch of anonymized packets 3. The server uses the trimmed look up tables 14, 15 to de-anonymize the anonymized MAC addresses and SSIDs in the anonymized packets 3 it has received.

The trimmed look up tables 14, 15 uploaded to the server therefore only contain MAC codes 10 and SSID codes 11 corresponding to devices that are associated to the LAN 1. They do not contain MAC codes 10 or SSID codes corresponding to third party devices. Therefore it is not possible to de-anonymize the MAC addresses or SSIDs associated with third party devices. Therefore, as with the first embodiment, this embodiment prevents the privacy of the third party devices from being infringed, while making available the MAC addresses and SSIDs of all devices associated to the LAN 1.

The method is performed at a data processing device. The data processing device receives packets from an associated sniffer and processes the packets in accordance with the disclosure.

Figure 4:
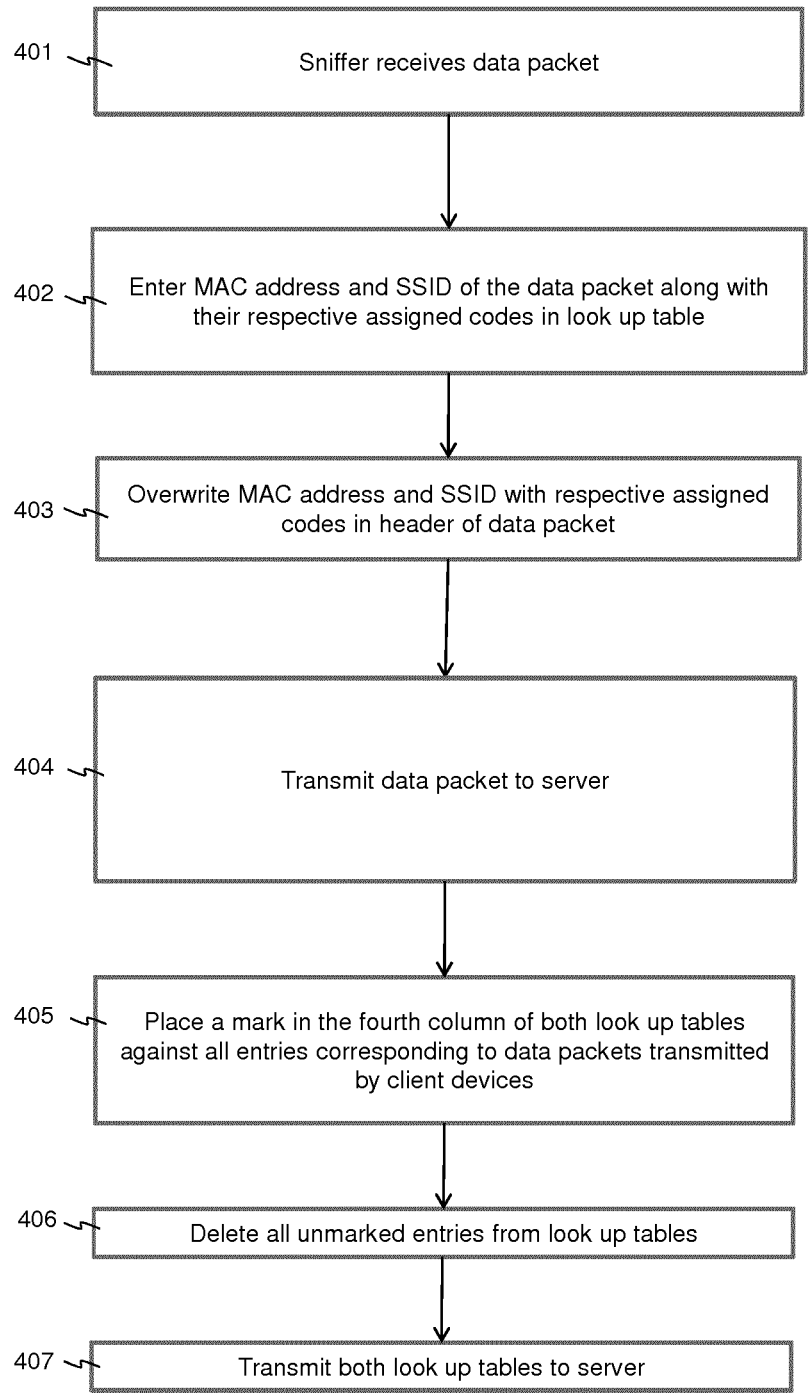
FIG. 4 is a flow chart illustrating an embodiment of a method according to the disclosure.

FIG. 4 is a flow chart summarizing the second embodiment of the method according to the disclosure and includes the following. At 401: the sniffer 60 receives a data packet 3. At 402: enter MAC address 21 and SSID 22 of the data packet 3 along with their respective assigned codes in look up table. At 403: overwrite MAC address 21 and SSID 22 with respective assigned codes in header of data packet 3. At 404: transmit data packet 3 to server 7. At 405: place a mark in the fourth column of both look up tables 14, 15 against all entries corresponding to data packets 3 transmitted by client devices 2. At 406: delete all unmarked entries from look up tables 14, 15. At 407: transmit both look up tables 14, 15 to server 7.

MULTIPLE SNIFFER ARRANGEMENT

Figure 5:
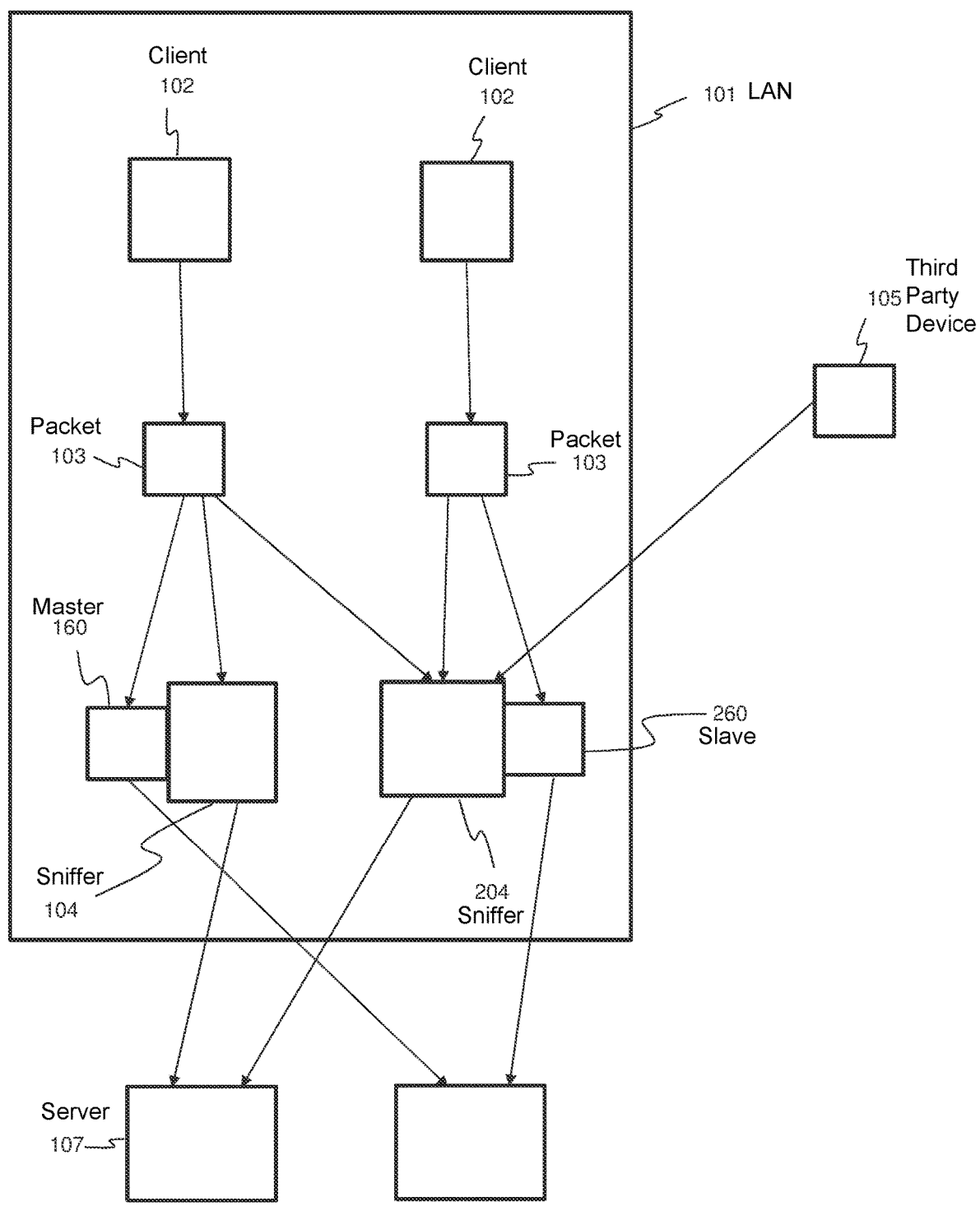
FIG. 5 is a schematic drawing of a LAN which is adapted to perform the method according to the disclosure, the LAN containing two access points.

In some embodiments there is more than one data processing device associated with a particular network, each of which has an associated sniffer (see FIG. 5). Unless otherwise described herein, components of LAN 101 as depicted in FIG. 5 are the same or similar to corresponding components of LAN 1, as depicted and described above with respect to FIG. 1. LAN 101, therefore, can include client devices 102, access points 104, 204, third party device 105, and server 107. Each data processing device 160, 260 performs the method in accordance with the disclosure as described above. The inventors have realized that if packets containing the same MAC addresses or SSIDs are processed by different processing devices, there is a risk that each data processing device will assign a different reference code to the MAC address or SSID. This may mean the MAC address or SSID will not be decoded correctly at the server. It is therefore desirable to ensure that the same reference code is assigned to the same MAC address or SSID. In order to achieve this, one data processing device is defined as the master 160 and the others are defined as slaves 260. Only one slave 260 is shown in FIG. 5. When packet 103 is processed by a slave 260, the slave 260 assigns an initial reference code to each MAC address/S SID and sends the reference code and MAC address/S SID to the master 160. If the master 160 has previously received that MAC address/SSID the master 160 sends the reference code that it assigned to the MAC address/S SID to all the slaves 260. If the master 160 has not previously received that MAC address/S SID, the master 160 assigns a reference code to that MAC address/SSID. The master 160 then either (i) sends its assigned reference code to all the slaves, which replace any initial reference code they have assigned with the master reference code in the packet 103 and look up tables; or (ii) enters the master reference code in a mapping table (not shown) alongside the slave's initial code. In arrangement (i) the server 107 uses the master and slaves' individual look up tables to decode the MAC address/SSIDs in the packets 103 it receives. In arrangement (ii) the server 107 uses the mapping table to decode the MAC address/SSIDs in the packets 103 it receives.

The invention claimed is:

1. A method of processing a data packet received by a packet sniffer, the data packet containing an associated identifier, the method comprising:
   modifying the data packet to anonymize the identifier by overwriting the identifier with a coded form of the identifier;
   transmitting the data packet to a recipient;
   determining whether the identifier corresponds to a particular network;
   in response to determining that the identifier corresponds to the particular network, transmitting to the recipient a data file including decoding information to enable the coded form of the identifier to be decoded, after the data packet is received by the recipient; and
   in response to determining that the identifier does not correspond to the particular network, withholding the identifier from the recipient.

2. The method as claimed in claim 1, wherein the data packet contains a plurality of identifiers and the method is performed in respect of each identifier in the plurality of identifiers.

3. The method as claimed in claim 2, wherein the plurality of identifiers comprises one or more media access control (MAC) addresses.

4. The method as claimed in claim 3, wherein the plurality of identifiers comprises between three and six MAC addresses inclusive.

5. The method as claimed in claim 2, wherein the plurality of identifiers comprises one or more service set identifiers (SSIDs).

6. The method as claimed in claim 1, wherein the decoding information comprises a reference code.

7. The method as claimed in claim 1, wherein the decoding information is recorded in a table.

8. The method as claimed in claim 1, wherein the decoding information is sent to the recipient separately from the data packet.

9. The method as claimed in claim 1, wherein the recipient is a server.

10. The method as claimed in claim 1, wherein the particular network is a local area network (LAN).

11. The method as claimed in claim 1, wherein the method further comprises removing some or all of a payload of the data packet before transmitting the data packet to the recipient.

12. A network device adapted to process a data packet, the network device comprising:
   a transmitter adapted to modify the data packet to anonymize an identifier in the data packet by overwriting the identifier with a coded form of the identifier and transmit the data packet to a recipient; and
   a determiner adapted to determine whether the identifier corresponds to a particular network;
   wherein in response to the determiner determining that the identifier corresponds to the particular network, the network device is adapted to transmit to the recipient a data file including decoding information to enable the coded form of the identifier to be decoded after the data packet is received by the recipient; and
   further wherein in response to the determiner determining that the identifier does not correspond to the particular network, the network device is adapted to withhold the identifier from the recipient.

\* \* \* \* \*